(12) United States Patent
Gornatti

(10) Patent No.: US 8,240,977 B2
(45) Date of Patent: Aug. 14, 2012

(54) WIND COLLECTOR DEVICE FOR GENERATION OF ENERGY

(76) Inventor: Marcelo Ricardo Gornatti, Buenos Aires (AR)

(*) Notice: Subject to any disclaimer, the term of this patent is extended or adjusted under 35 U.S.C. 154(b) by 437 days.

(21) Appl. No.: 12/517,226

(22) PCT Filed: Dec. 7, 2007

(86) PCT No.: PCT/EC2007/000003
§ 371 (c)(1),
(2), (4) Date: Jun. 2, 2009

(87) PCT Pub. No.: WO2008/071200
PCT Pub. Date: Jun. 19, 2008

(65) Prior Publication Data
US 2009/0274561 A1   Nov. 5, 2009

(30) Foreign Application Priority Data
Dec. 14, 2006  (AR) .......................... P20060105510

(51) Int. Cl.
*F03D 7/06* (2006.01)
(52) U.S. Cl. .................... 415/4.2; 416/DIG. 6
(58) Field of Classification Search .......... 415/4.2, 415/4.4, 907; 416/DIG. 6
See application file for complete search history.

(56) References Cited

U.S. PATENT DOCUMENTS

| | | | | |
|---|---|---|---|---|
| 997,802 | A * | 7/1911 | De Geofroy | 415/4.2 |
| 3,994,621 | A | 11/1976 | Bogie et al. | |
| 6,015,258 | A * | 1/2000 | Taylor | 415/4.4 |
| 6,465,899 | B2 * | 10/2002 | Roberts | 290/44 |
| 6,666,650 | B1 * | 12/2003 | Themel | 416/200 R |
| 2003/0209911 | A1 | 11/2003 | Pechler et al. | |

FOREIGN PATENT DOCUMENTS

| WO | WO 8100436 | 2/1981 |
|---|---|---|
| WO | WO 9119093 | 12/1991 |

* cited by examiner

*Primary Examiner* — Dwayne J White
(74) *Attorney, Agent, or Firm* — Defillo & Associates, Inc.; Evelyn A. Defillo

(57) ABSTRACT

A wind collector device for energy production comprising a fixed external structure formed by a vertical cylinder having two bases, the upper and the lower, of variable height and diameter, with vertical dividing walls distributed circumferentially and equidistantly, which form nozzles that concentrate and channel the wind; wherein inside the structure is arranged in concentric form at least one turbine, including a rotation shaft sustained between the bases and associated to an upper and a lower bearing, to which multiple radial vanes are fixed, to transmit this movement to complementary transmission means supported by at least a power generator.

3 Claims, 7 Drawing Sheets

WIND COLLECTOR DEVICE FOR GENERATION OF ENERGY

CROSS REFERENCE TO RELATED APPLICATION

This application is a national stage entry of PCT/EC2007/000003 filed Dec. 7, 2007, under the International Convention claiming priority over Argentina application No. P20060105510 filed Dec. 14, 2006.

TECHNICAL FIELD OF THE INVENTION

The present invention relates to a wind collector device for the generation of energy, of vertical cylindrical form, made up of nozzles which concentrate the wind formed by vertical walls and superior and inferior bases, which concentrate the zone's natural wind diverting to the interior of the cylinder where a radial turbine is arranged in vertical form, for energy generation.

STATE OF THE TECHNIQUE AND PROBLEMS TO SOLVE

In general as it is known, one of the problems that present the use of a great amount of energy wind generators is that they are mounting over columns or great size supports. The present invention was intended for the purpose to place the device in the ground, above a water tank, above a silo, in the ceiling of a shed, etc; or any preexisting structure, since the device can occupy a minimum surface and does not have a limit on the height. In addition, the device of the present invention has the advantage of providing a greater use life than all the known devices until this moment, since a smaller wear and tear of the movable pieces is achieved, thereby obtaining a smaller maintenance cost. Taking advantage of the zone's natural wind, the device can be arranged in a reduced area since it is fabricated without any height top limit, and is obtained a greater energy generation since it does not have a height or diameter limit, there is not any limit in the motor generator, and neither has a limit in the wind speed, or the produced energy.

OBJECTIVE OF THE INVENTION

The purpose of the present invention is obtained by means of the construction of a device of vertical cylindrical form that has a base or floor and a ceiling that connects in inferior and superior parts of the device to several vertical walls constructed around a central cylindrical space where a radial turbine is located; wherein the walls are placed at determined angles forming wind concentrated nozzles, diverting it towards the interior of the cylinder where the radial turbine is arranged in vertical form, for energy generation.

BRIEF DESCRIPTION OF THE DRAWINGS

In order to make more clear the objective of the present invention; it has been illustrated with 7 schematic figures, as demonstrative example.

DETAILED DESCRIPTION OF THE INVENTION

Figure 1:
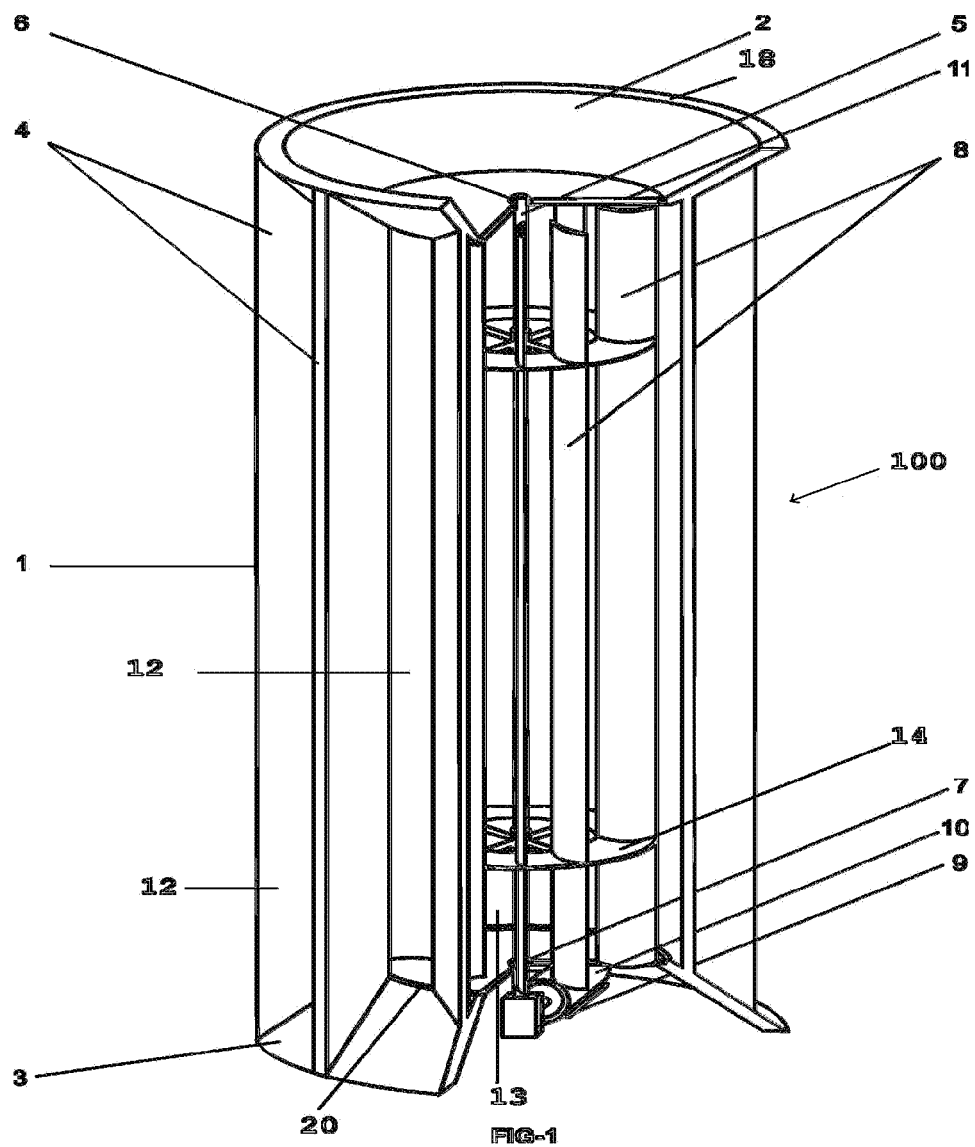
FIG. 1, shows a perspective view of the device of the present invention showing the different components of the wind collector device.

In all the figures, the same reference numbers indicate equal or corresponding elements:
1. cylindrical housing
2. Upper base of the cylindrical housing (1)
3. Lower base of the cylindrical housing (1)
4. Vertical dividing walls
5. Rotation shaft
6. Upper bearing
7. Lower bearing
8. Radial vanes
9. transmission device
10. Power generator
11. Movable protection cover
12. nozzles
13. central axial orifice
14. radial turbine
18. open end of bases 6 and 7
20. closed end of bases 6 and 7
100. wind collector device As can be recognized in the figures, the present invention is formed by main elements operatively linked with each other. The cylindrical housing 1 has a variable height and diameter and comprises vertical dividing walls 4 that form wind collector nozzles 12. At least one turbine having its axis connected to a power generator 10 is placed on the central axial orifice 13.

A wind collector device for energy generation 100 comprises a cylindrical housing 1, an upper base 2 attached to the upper end of the cylindrical housing 1, and a lower base 3 attached to the lower end of the cylindrical housing 1. Dividing walls 4 are placed adjacent to each other and circumferentially distributed between the upper base 2 and the lower base 3. The dividing walls 4 are placed a predetermine angle in relation with the upper base 2 and the lower base 3 forming nozzles 12 that direct the wind towards the central axial orifice 13. A radial turbine 14 is placed on the central axial orifice 13. The radial turbine 14 includes a rotation shaft 5 having a first end connected to an upper bearing 6 located on the upper base 2 and a second end connected to a lower bearing 7 located on the lower base 3. The turbine 14 includes multiple radial vanes 8 linked to transmission device 9 supported by a power generator 10.

The dividing walls 4 are placed a predetermine angle in relation with the upper base 2 and the lower base 3, so an angle bisector formed by the two contiguous dividing walls 4 defines the greater incidence point 22 on the radial vanes 8. The number of radial vanes 8 may be greater or equal to the number of nozzles 12 formed by the dividing walls 4.

The radial vanes 8 have an aerodynamic profile, preferably with a concave shape. The dividing walls 4 may have a straight profile or a concave shape.

The upper base 2 and the lower base 3 have a concave shape with an open end 18 facing away from the cylindrical housing 1 and a closed end 20 facing the cylindrical housing 14. (FIGS. 1-4).

Figure 2:
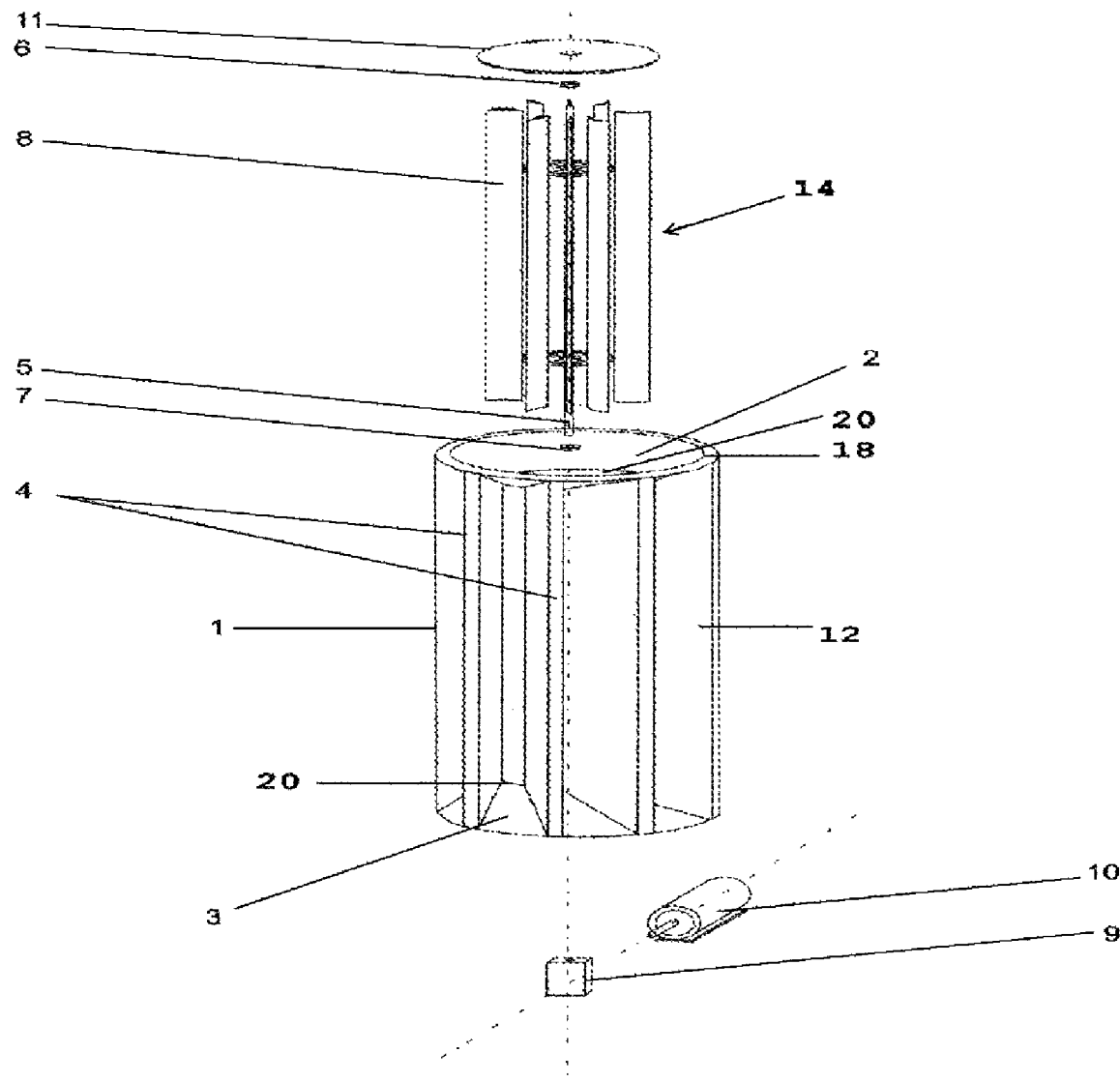
FIG. 2, shows an exploited view of the components of the wind collector device.
Figure 3:
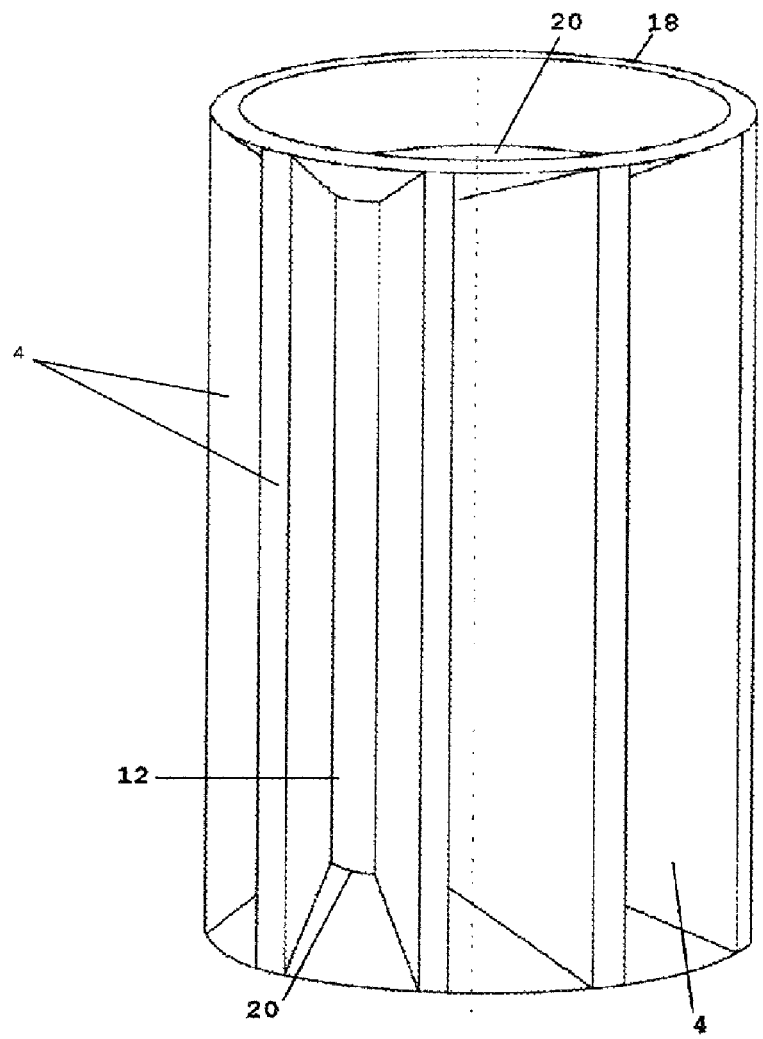
FIG. 3, shows a perspective view of the fixed external structure of vertical cylindrical form of the collector device.
Figure 4:
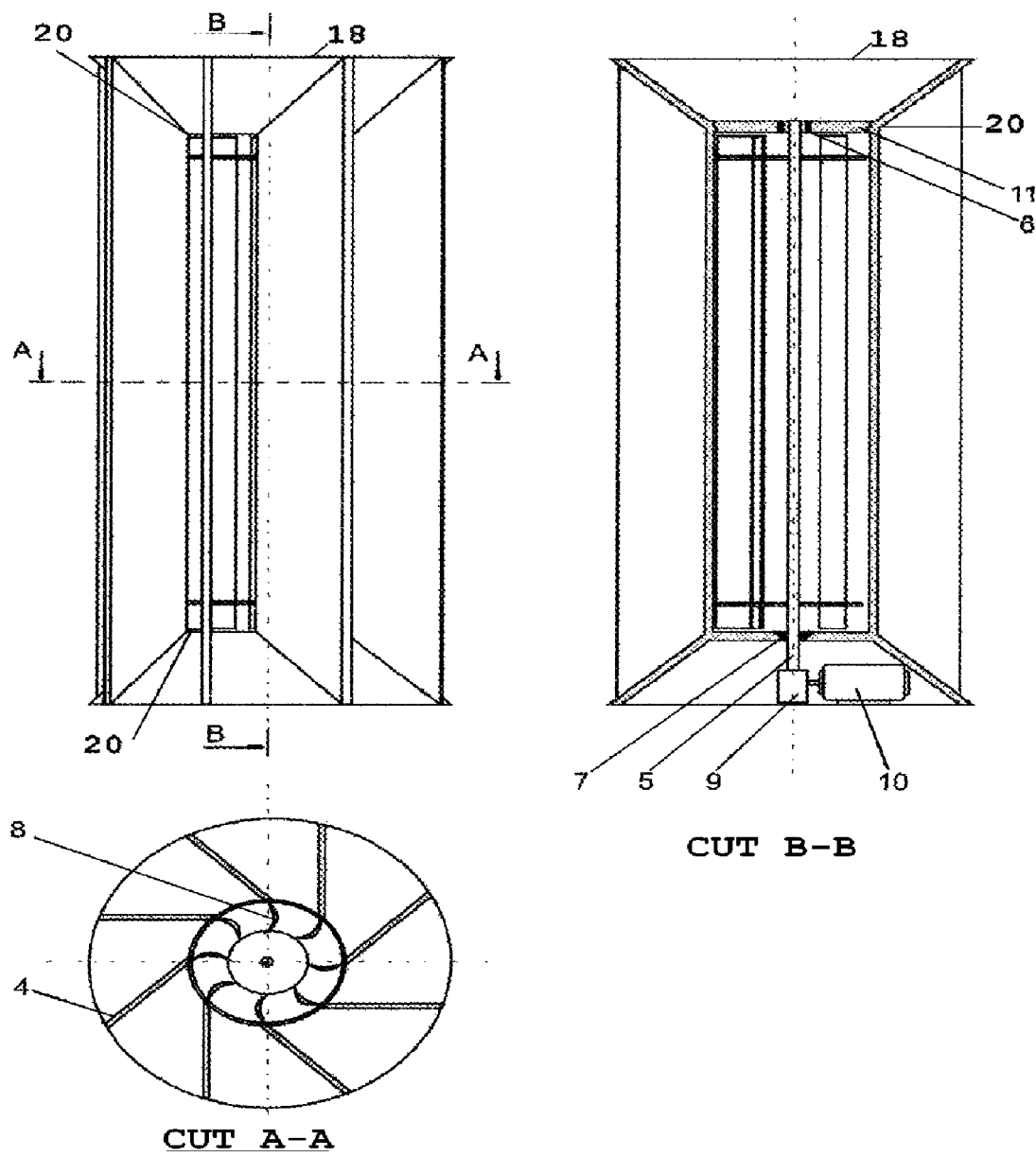
FIG. 4, shows a cut view of the device.
Figure 5:
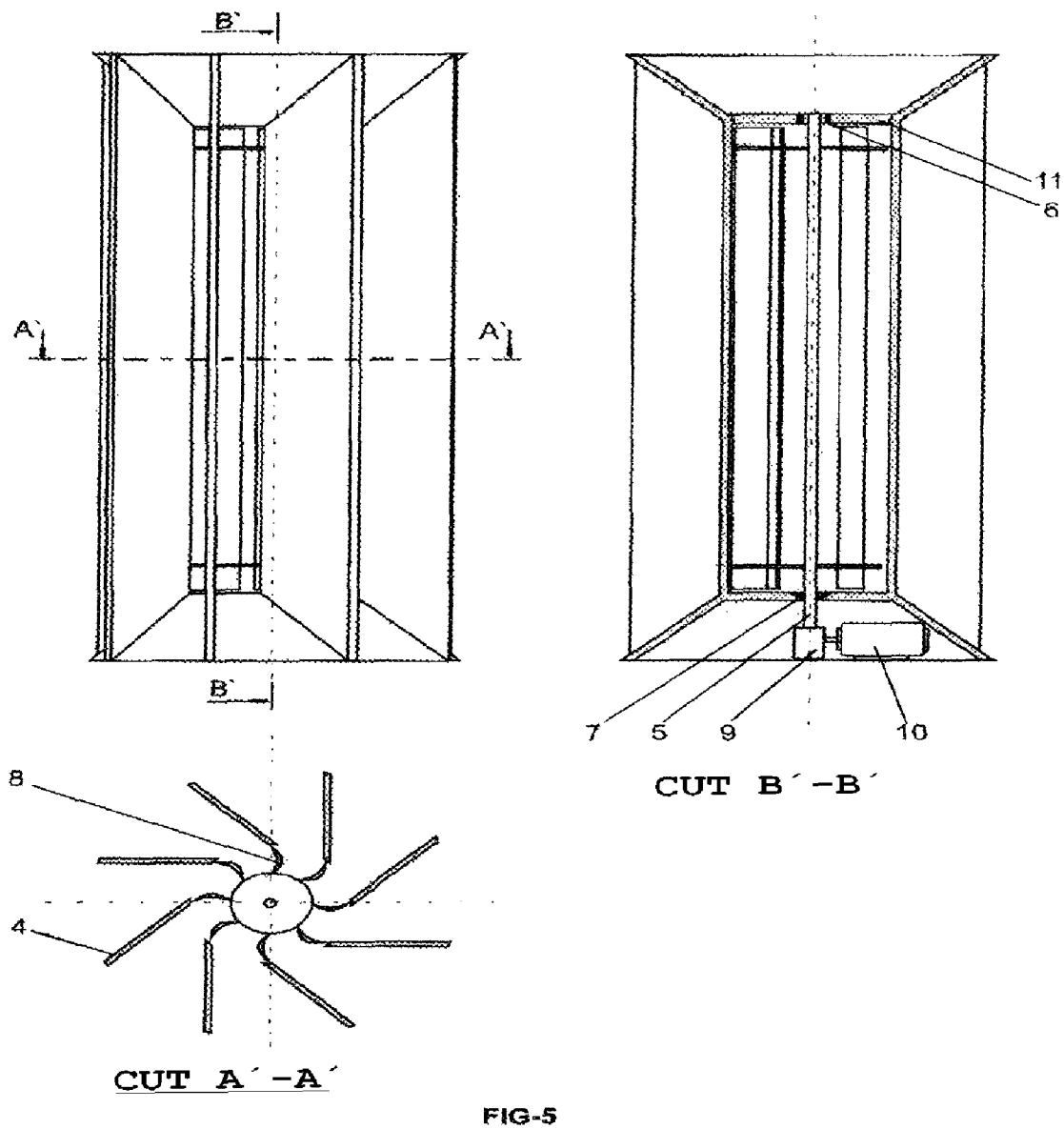
FIG. 5, shows another cut view of the device.
Figure 6:
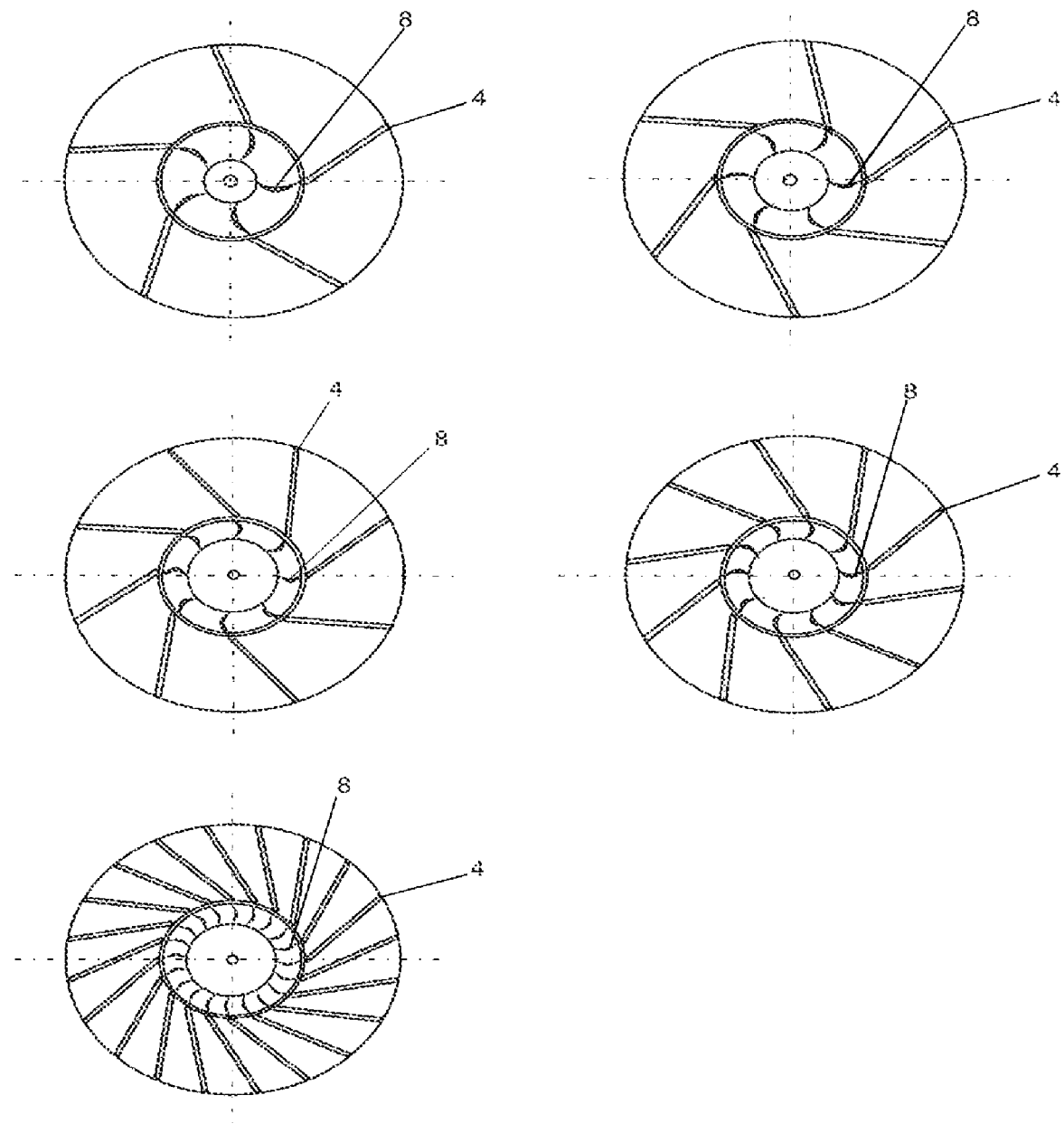
FIG. 6, shows different variants on the number of vanes and dividing walls that integrate the collector device.
Figure 7:
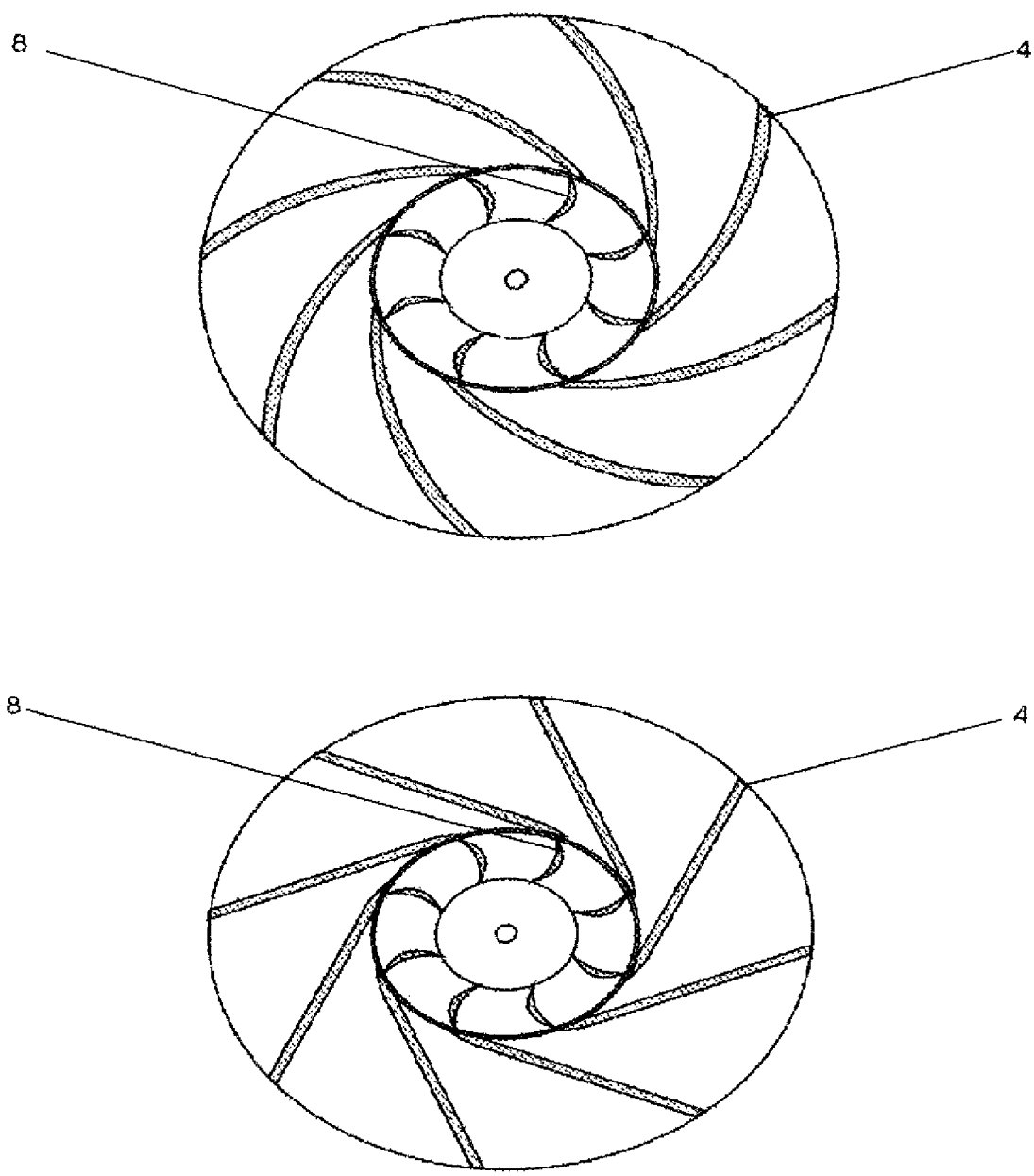
FIG. 7, shows an embodiment on which the dividing walls are slightly concave.

A removable cover 11 may be connected to the closed end 20 of the upper base 2 and the lower base. The removable cover 11 may be placed for weather protection and the repair of components. The removable cover 11 has the shape of a disk (FIG. 2).

Basically when an air flow current enters onto the wind collector nozzles 12, the air flow is directed to the central axial orifice 13 in which a radial turbine 14 is placed. The air flow produces the turning of the turbine 14, which is connected to a transmission device 9 and to a power generator 10.

All the components of the device can be obtained in the market which makes the diversification of suppliers of provisions and spare parts possible.

The accomplishment of this invention could be carried out in the sizes, materials, and formats that are considered more advisable to the intended means.

The invention claimed is:

1. A wind collector device for energy generation comprising:
    a cylindrical housing including an upper end, a lower end, and a central axial orifice;
    an upper base attached to the upper end of the cylindrical housing, the upper base has a concave shape with an open end facing away from the cylindrical housing and a closed end facing the cylindrical housing;
    a lower base attached to the lower end of the cylindrical housing, the lower base has a concave shape with an open end facing away from the cylindrical housing and a closed end facing the cylindrical housing;
    a plurality straight profile dividing walls placed adjacent to each other and circumferentially distributed between the upper base and the lower base;
    the dividing walls are placed at a predetermined angle in relation with the upper base and the lower base forming nozzles that direct ambient wind towards the central axial orifice;
    a radial turbine is placed on the central axial orifice, the radial turbine including a rotation shaft having a first end connected to an upper bearing located on the upper base and a second end connected to a lower bearing located on the lower base, the radial turbine includes multiple radial vanes, the radial turbine is connected to a transmission device supported by a power generator; and
    a removable cover having a flat disk shape, the removable cover is connected to at least one of the closed end of the upper base and the closed end of the lower base.

2. The wind collector device for energy generation according to claim 1, wherein an angle bisector formed by two adjacent dividing walls define a greater incidence point on the corresponding radial vane moving the ambient wind.

3. A wind collector device for energy generation consisting of:
    a cylindrical housing including an upper end, a lower end, and a central axial orifice;
    an upper base attached to the upper end of the cylindrical housing, the upper base has a concave shape with an open end facing away from the cylindrical housing and a closed end facing the cylindrical housing;
    a lower base attached to the lower end of the cylindrical housing, the lower base has a concave shape with an open end facing away from the cylindrical housing and a closed end facing the cylindrical housing;
    a plurality straight profile dividing walls placed adjacent to each other and circumferentially distributed between the upper base and the lower base;
    the dividing walls are placed at a predetermined angle in relation with the upper base and the lower base forming nozzles that direct ambient wind towards the central axial orifice;
    a radial turbine is placed on the central axial orifice, the radial turbine including a rotation shaft having a first end connected to an upper bearing located on the upper base and a second end connected to a lower bearing located on the lower base, the radial turbine includes multiple radial vanes, the radial turbine is connected to a transmission device supported by a power generator; and
    a removable cover having a flat disk shape, the removable cover is connected to at least one of the closed end of the upper base and the closed end of the lower base.

* * * * *